(12) United States Patent
Blalock et al.

(10) Patent No.: US 7,587,030 B2
(45) Date of Patent: Sep. 8, 2009

(54) SYSTEM AND METHOD FOR PROVIDING CENTRALIZED EMERGENCY MANAGEMENT

(75) Inventors: John R. Blalock, Ft. Washington, MD (US); Jonathan C. Pruett, Washington, DC (US); Michael J. Fanning, Silver Spring, MD (US); Pat Mendonca, Damascus, MD (US)

(73) Assignee: The United States of America as represented by the United States Postal Service, Washington, DC (US)

( * ) Notice: Subject to any disclaimer, the term of this patent is extended or adjusted under 35 U.S.C. 154(b) by 421 days.

(21) Appl. No.: 10/952,838

(22) Filed: Sep. 30, 2004

(65) Prior Publication Data

US 2005/0220277 A1 Oct. 6, 2005

Related U.S. Application Data

(60) Provisional application No. 60/554,375, filed on Mar. 19, 2004.

(51) Int. Cl.
*H04M 11/14* (2006.01)
*G08B 9/00* (2006.01)
(52) U.S. Cl. .............................. 379/37; 379/45; 379/49
(58) Field of Classification Search ......... 379/320–350; 340/286.02, 506, 531, 539.17; 707/100, 707/104.1
See application file for complete search history.

(56) References Cited

U.S. PATENT DOCUMENTS 6,169,476 B1 * 1/2001 Flanagan ............... 340/286.02

| | | | |
|---|---|---|---|
| 6,807,564 B1 * | 10/2004 | Zellner et al. | 709/206 |
| 2002/0138197 A1 * | 9/2002 | Schramke et al. | 701/213 |
| 2003/0141971 A1 * | 7/2003 | Heiken, Jr. | 340/506 |
| 2003/0197615 A1 * | 10/2003 | Roche et al. | 340/573.1 |
| 2004/0070515 A1 * | 4/2004 | Burkley et al. | 340/825.49 |

OTHER PUBLICATIONS

Sullivan; A Risk Mapping system; Oct. 2, 2003; WO03/081470 A1.*
International Search Report and Written Opinion for International Application No. PCT/US04/31944, dated May 12, 2006, (11 pages).

* cited by examiner

*Primary Examiner*—Melur Ramakrishnaiah
(74) *Attorney, Agent, or Firm*—Finnegan, Henderson, Farabow, Garrett & Dunner, LLP

(57) ABSTRACT

A system and method for management of emergencies. The system includes a database containing procedures for addressing specific emergencies, an input system linked to the database for receiving input information indicative of an emergency, an evaluation system linked to the database for determining if information input to the input system justifies the designation of a specific emergency and dissemination of information related thereto. A communication system is linked to the database for disseminating information about the input information and information related thereto to designated entities. The method for management of emergencies includes the inputting procedures for addressing specific emergencies into a database, inputting information about potential emergencies into to the database, determining if the information about potential emergencies justifies the designation of a specific emergency and determining if the information about potential emergencies justifies dissemination of information related thereto. Based on the determination of whether said information justifies the designation of a specific emergency and dissemination of information related thereto, information of a specific emergency and information related thereto may be disseminated via the database to designated entities.

43 Claims, 5 Drawing Sheets

SYSTEM AND METHOD FOR PROVIDING CENTRALIZED EMERGENCY MANAGEMENT

CROSS REFERENCE TO RELATED APPLICATION

This application claims priority to U.S. Provisional Application No. 60/554,375 filed Mar. 19, 2004, entitled "System and Method for Providing Centralized Emergency Management System," the contents of which are incorporated by reference herein.

FIELD OF THE INVENTION

This invention relates generally to centralized management of emergency plans and activities.

BACKGROUND OF THE INVENTION

Every year, millions of dollars are lost in productivity and assets due to emergencies. Emergencies may even cause loss of life. In many instances, businesses and organizations can prevent at least some of the losses associated with emergencies by planning for emergencies in advance. To better prepare for an emergency by timely identifying warning signs of potential emergency and evaluating their legitimacy, and responding in the most efficient manner, an organization may use procedures for recognizing potential threats and implement rules and procedures to follow once an emergency occurs.

In the event a disaster strikes, participation and involvement of a wide range of different agencies and organization, both government and private, may become necessary. Human and technical resources of many agencies and organizations may be needed to respond to an emergency. Each organization may follow its own rules and procedures without knowledge of steps and measures taken by other organizations involved. As a result, each organization may waste time and resources by responding to a disaster, collecting and recording facts, and analyzing information related to a disaster when other agencies or entities are doing the same operations. For example, several different entities may be conducting testing, planning remedial measures, and collecting information and evidence.

Typically, significant amount of collected information may remain within an individual organization that originally collected the information. Only limited information may be shared between agencies and organizations due to lack of centralized network where all the information may be forwarded for sharing. Because information is scattered among numerous agencies and organizations, communication, collaboration, and coordination among these entities may require significant expenditure of resources It is accordingly a primary object of the invention to provide a centralized and automated information management system capable of tracking, monitoring, collecting, notifying, distributing, recording, and storing all the information related to emergency events, their mitigation and the possible aftermath.

This is achieved by providing a wireless system that disseminates information concerning emergency events and efforts to mitigate their effect. Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

SUMMARY OF THE INVENTION

In accordance with the invention, there is provided a system for management of emergencies. The system may include a database containing procedures for addressing specific emergencies, an input system linked to the database for receiving input information indicative of an emergency, an evaluation system linked to the database for determining if information input to the input system justifies the designation of a specific emergency and dissemination of information related thereto. A communication system is linked to the database for disseminating information about the input information and information related thereto to designated entities.

There is also provided a method for management of emergencies. The method may include the inputting procedures for addressing specific emergencies into a database, inputting information about potential emergencies into to the database, determining if the information about potential emergencies justifies the designation of a specific emergency and determining if the information about potential emergencies justifies dissemination of information related thereto. Based on the determination of whether said information justifies the designation of a specific emergency and dissemination of information related thereto, information of a specific emergency and information related thereto may be disseminated via the database to designated entities.

It is to be understood that both the foregoing general description and the following detailed description are exemplary and explanatory only and are not restrictive of the invention, as claimed.

The accompanying drawings, which are incorporated in and constitute a part of this specification, illustrate one embodiment of the invention and together with the description, serve to explain the principles of the invention.

DESCRIPTION OF THE EMBODIMENTS

Reference will now be made in detail to the present embodiment of the invention, an example of which is illustrated in the accompanying drawings. Wherever possible, the same reference numbers will be used throughout the drawings to refer to the same or like parts.

To facilitate planning and execution of emergency management activities, an organization may design, build, and maintain an emergency management system. Such a system may have one or several designated servers where an emergency management system database may reside.

Figure 1:
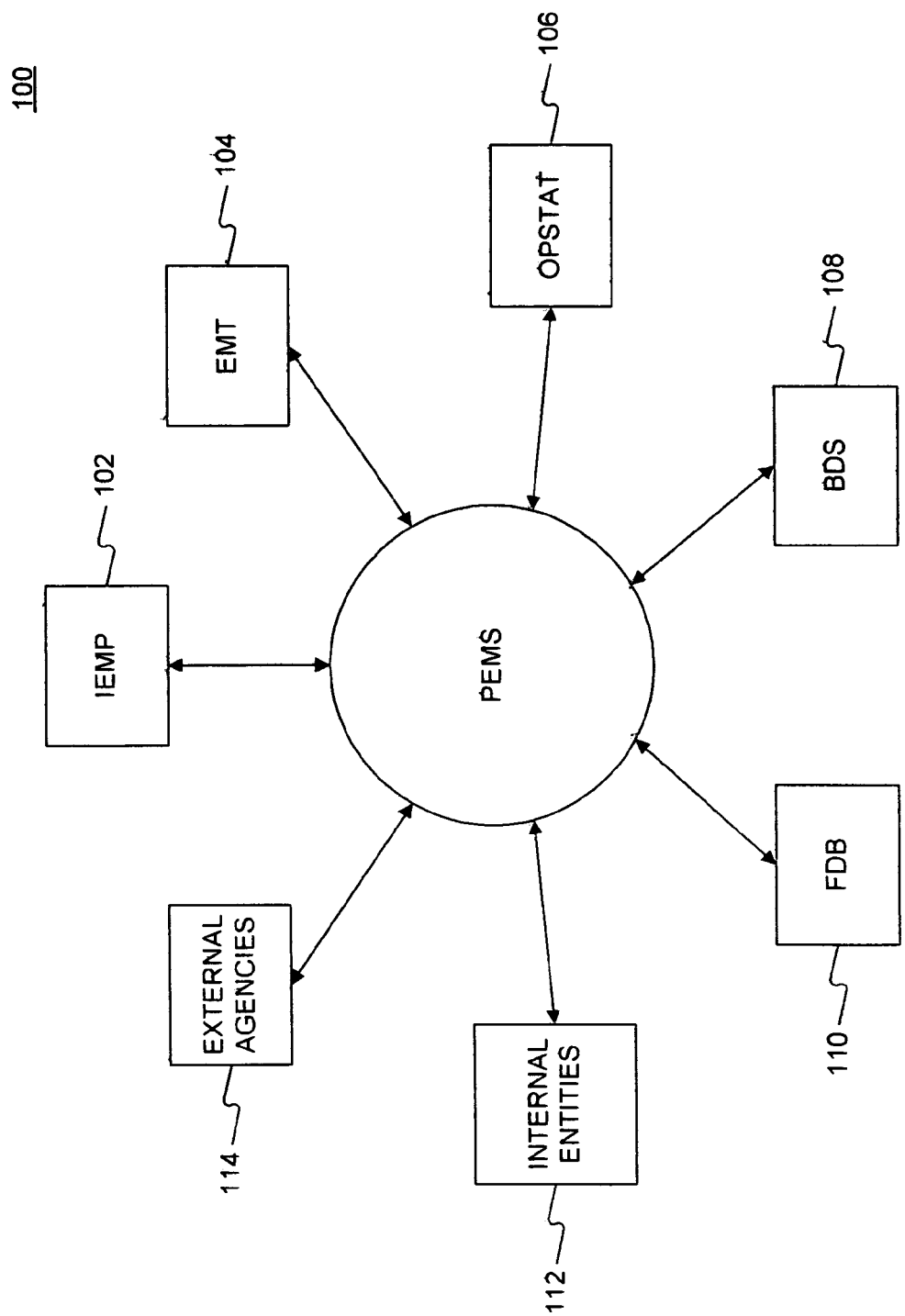
FIG. 1 is a schematic representation of an embodiment of an emergency management system.

FIG. 1 depicts an exemplary structure of an emergency management system database. To effectively respond to emergencies, emergency management system database 100 may include, for example, integrated emergency management plan database 102. The integrated emergency management plan database may be designed to consolidate all emergency management planning activities and processes and may include lists of standardized emergency management rules and procedures incorporating all past specific incident efforts.

The emergency management system database 100 may further include emergency management organization database 104. The emergency management organization may contain lists and contact information of people responsible for responding to an emergency.

To enable personnel to report field incidents and emergency events, an organization may establish a call center. Employees wishing to report any suspicious events, for example, an explosion or suspicious smell, may contact the call center using a designated toll free telephone number, such as a 1-800 number. The emergency management system (EMS) database 100 may have an interface with an operations status call center (OPSTAT) 106. The purpose, functions, and basic structure of operations status call center is discussed below. To monitor all potential biological hazards, emergency management system database 100 may also include, for example, biohazard detection system (BDS) 108. The emergency management system may automatically trigger emergency biohazard alert initiating emergency response procedures when BDS detects a predetermined level of biological agents. For example, an emergency alert may be triggered automatically, without involvement of a human, when a monitoring device detects anthrax within mail processing equipment of a service provider.

To monitor and efficiently facilitate responses to emergencies, the emergency management system database 100 may further include, for example, an organization's facilities database (FDB). The facilities database may contain maps, two-dimensional or three-dimensional images of the facilities structures, records of security codes and copies of procedures, and any other information necessary or helpful for people responding to an emergency within an organization facility. For example, the facilities database may receive and forward to the emergency management system database images recorded by security video cameras installed inside a facility. In another example, the facilities database may provide the emergency management system with output readings of sensor equipment, such as temperature or pressure sensors, installed inside or outside a facility.

To provide a mechanism to communicate, coordinate, and collaborate among different organizations and agencies during and after an emergency, the emergency management system database 100 may also exchange information with organization's numerous internal entities 112, such as a human resource department, and external agencies 114, such as the local police, the FBI or the Office of Homeland Security. An exemplary list of the agencies and entities is discussed below.

An organization may integrate all its emergency management plans related to different hazards into one plan, for example, an integrated emergency management plan or (IEMP). An emergency management system may contain standardized plans and procedures tailored for specific hazards and list responsibilities of personnel involved with emergency response and management. For example, a list of specific hazards may include: biological toxins such as anthrax tularemia, cholera, encephalitis, botulism, plague and other bacteria, virus or fungi toxic to humans, ash fall associated with volcanic activity, chemical agents such as nerve, blister, blood, chocking and incapacitating agents, civil disorders, communications disruptions, power outages, fire, flood, high wind, hazardous materials spills, crime, tidal waves, hurricanes, and severe winter weather.

Figure 2:
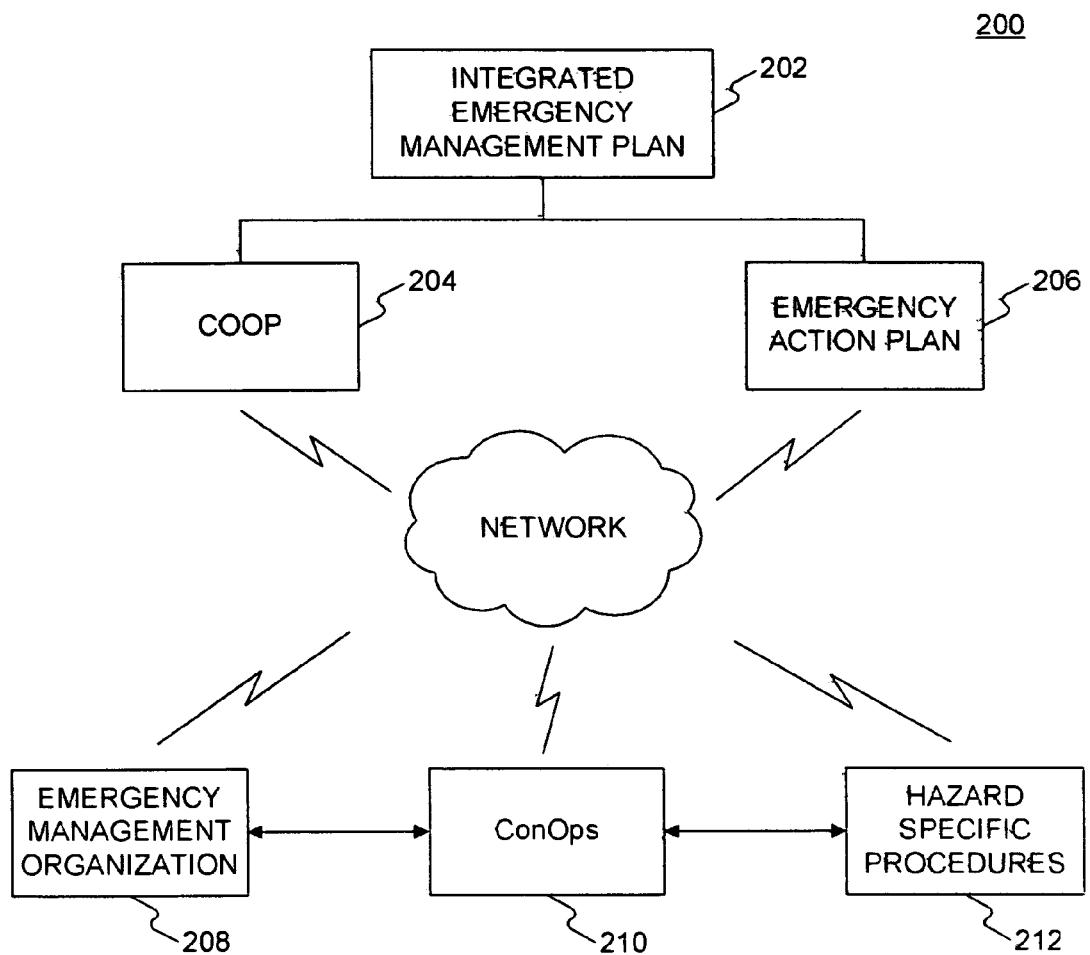
FIG. 2 is a schematic representation of an embodiment of an integrated emergency management plan.

FIG. 2 depicts an exemplary structure of an emergency management system database 202. To maintain a list of operational tasks and procedures enabling an organization to move its operations to an alternative facility in case of an emergency, emergency management system database may include a continuation of operations (COOP) database 204. A continuation of operations database 204 may maintain the most current and accurate emergency response information related, for example, to alternative facilities and routes for evacuation.

To maintain a list of the most current evacuation plans and procedures, integrated emergency management plan database 202 may exchange information with, for example, an emergency action plan (EAP) database 206. An emergency action plan database 206 may contain emergency management organization (EMO) database 208. An emergency management organization may contain, for example, a list and contact information of personnel responsible for responding to an emergency. In another embodiment, emergency management organization database may include different lists for different groups of people responsible for responding to different types of emergencies. For example, a fire department and its personnel may be contacted in the event of the fire at a facility, but local health department personnel may be contacted only if a biohazard is detected.

An integrated emergency management plan database 202 may also exchange information with, for example, a continued operations plan (ConOps) database 210. A continued operations plan may contain lists of generic tasks and procedures that need to be completed following an emergency, such as de-contamination of a facility and equipment, final testing, and health screening of the personnel exposed to a hazard. Integrated emergency management plan database 202 may also exchange information with specific plans and procedures database 212 compiled and organized in relation to specific hazards, such as radiological contamination, flooding, fire, explosion, bio-hazardous material contamination, toxic chemical contamination, or a bomb threat.

Figure 3:
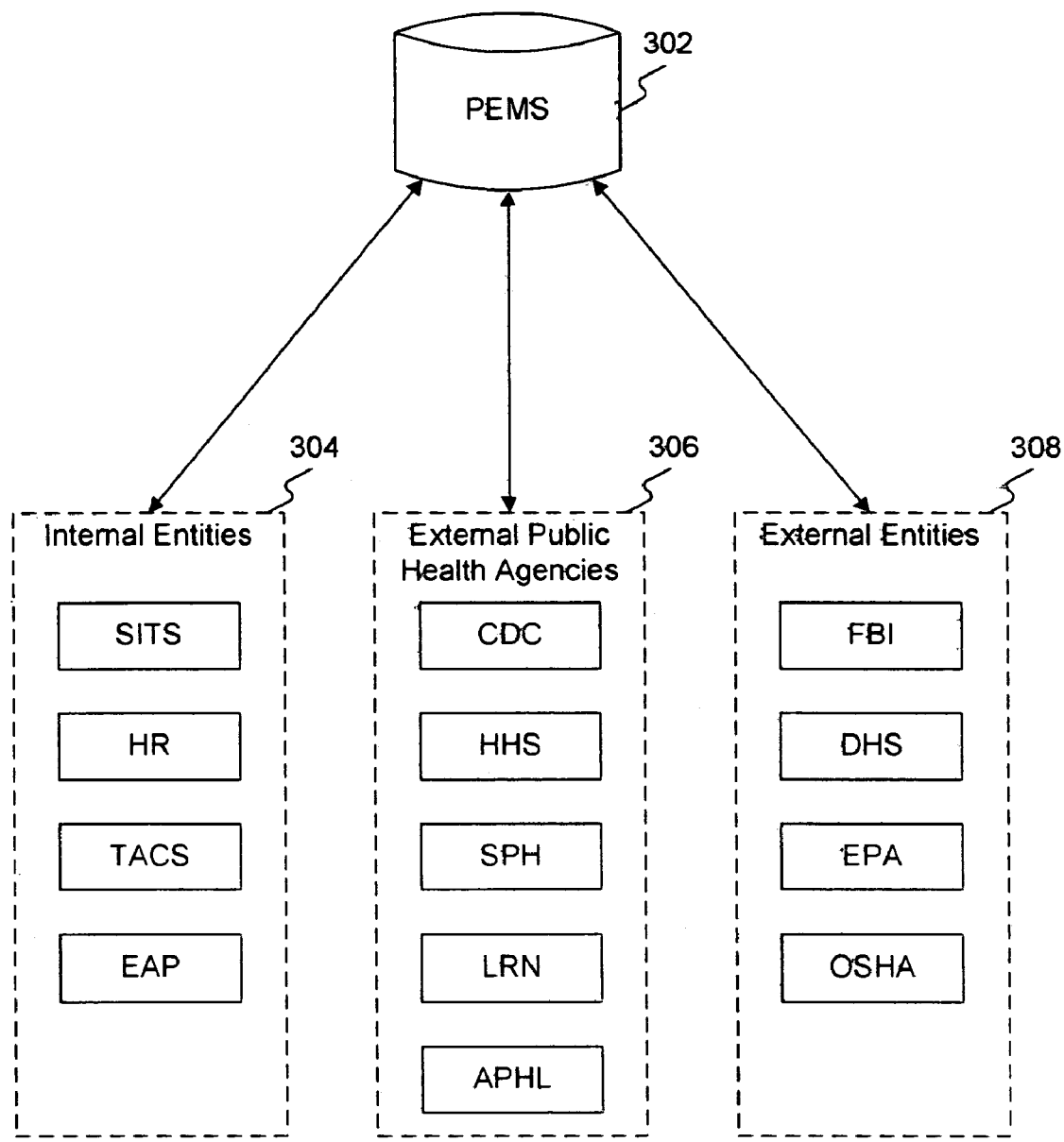
FIG. 3 is a schematic representation of an embodiment of an information exchange system between an emergency management system and internal entities and external agencies.

FIG. 3 is an exemplary structure of information exchange between an emergency management system, organization's internal entities 112 and external agencies 114 (FIG. 1). To more efficiently mitigate current emergencies and to better prepare and plan for future incidents, a group of an organization internal departments and entities 304 may exchange information with the emergency management system. The group 304 may include, for example, suspicious illness tracking system (SITS), human resources (HR), time and attendance control system (TACS), and employee assistance program (EAP). Information provided by each of these departments may be extremely important for effective management of an ongoing emergency incident. For example, the time and attendance control system may identify employees present in a building just before an emergency took place. Knowing the number and location of people in a building may enable a search and recovery team to more efficiently search for people immediately following an emergency at a specific building or facility. In another example, abnormal amount of specific illnesses recorded by the suspicious illness tracking system within certain period of time may trigger an emergency alert. In yet another example, information supplied by human resources or the employee assistance program may help to identify group of individuals or specific individuals who may require immediate medical assistance following, for example, exposure to hazardous conditions or substances because of their specific health conditions.

In an alternative embodiment, information provided by an organization's internal entities may be used for to mitigate the impact of an emergency following occurrence of an incident. For example, if a biohazard, such as anthrax, is detected within a mail processing facility, emergency management may use the emergency management system to track down personnel who could have had an exposure to a biohazard for follow up medical testing. Further, emergency management may use the emergency management system to identify, for follow-up testing purposes, all the facilities and equipment that could have been contaminated because contaminated materials such a piece of mail have passed through those facilities and the equipment therein. To facilitate timely recognition and response to an incident as well as efficient initial recovery following an incident, the emergency management system may also exchange information with a group of external public health agencies 306. For example, the emergency management system may exchange information with the Center for Disease Control (CDC), Health and Human Services (HHS), state public health agencies (SPH), the Laboratory Resources Network (LRN), and the Association of Public Health Laboratories (APHL). These entities typically may monitor different aspects of population activities. Increased or abnormal levels of certain activities may also trigger an emergency alert. For example, increased levels of sales of certain medications or increased levels of emergency room visits within short period of time may indicate population radiological or biohazard exposure that may be input to the emergency management system.

To better mitigate, plan, and respond to an ongoing hazard, the emergency management system may further exchange information with numerous external agencies 308. For example, the emergency management system may exchange information with the FBI, the Department of Health Services, EPA, and OSHA. Emergency management may establish certain business rules based in the information the emergency management system may receive from these and other agencies. Certain predetermined events may result in automatic triggering of emergency procedures. For example, surge of sale of certain medications may indicate biological or radiological contamination. In another example, increased levels of certain chemicals in the air may be a result of accidental or malicious release of chemical ingredients resulting in contamination.

To enable centralized input, collection, and monitoring of information related to detected emergency incidents in a standardized manner, an organization may establish an operation status call center (OPSTAT) 106 (FIG. 1). Having an operation status call center may enable employees to report incidents via telephone using a designated toll free (e.g., 1-800) number. In an alternative embodiment, employees may report incidents via designated e-mail addresses, or using web based links.

Figure 4:
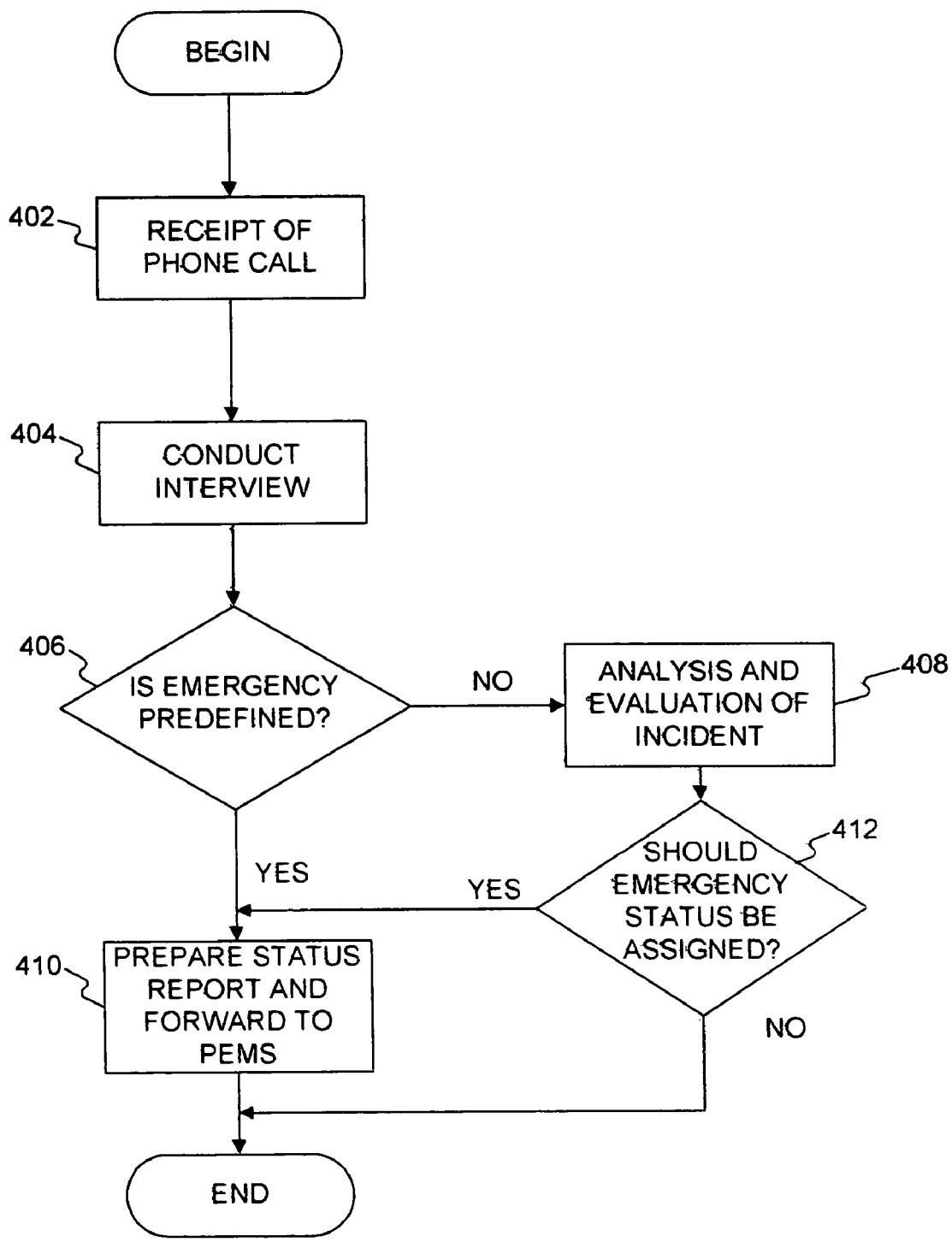
FIG. 4 is a flowchart of an exemplary process for evaluating incident reported to an operations status call center.

Centralizing all emergency related reporting may enable management emergency personnel and subject matter experts to better evaluate not only isolated incidents, but also to identify a pattern, if applicable. FIG. 4 is a flowchart of an exemplary process for evaluating incident reported to an operation status call center. After an operation status call center operator receives a phone call (step 402) reporting an incident, he or she may conduct an predetermined interview with the caller (step 404). The questionnaire may be designed to preliminarily evaluate an incident and identify potential hazards. If during an interview, a caller uses certain predefined key words (step 406), for example, "anthrax" or "bomb", an operation status call center operator then may immediately stop an interview and initiate emergency procedures. To initiate emergency procedures, an operation status call center operator may prepare an electronic status report of an incident and forward it to the emergency management system (step 410).

If a caller does not use any predefined key words, an operation status call center operator may forward a transcript of the interview to emergency management personnel or subject matter experts for analysis and evaluation of the reported incident (step 408). As a result of an evaluation process, a decision may be made whether to assign an emergency status to the reported incident (step 412). If an emergency status is assigned, an operator may prepare a status report and forward it to the emergency management system for initiation of emergency procedures (step 410).

In the alternative embodiment, a number of predetermined events may also trigger initiation of emergency procedures. For example, emergency management may decide that power outage or radiological levels above normal may result in an automatic initiation of emergency procedures.

Figure 5:
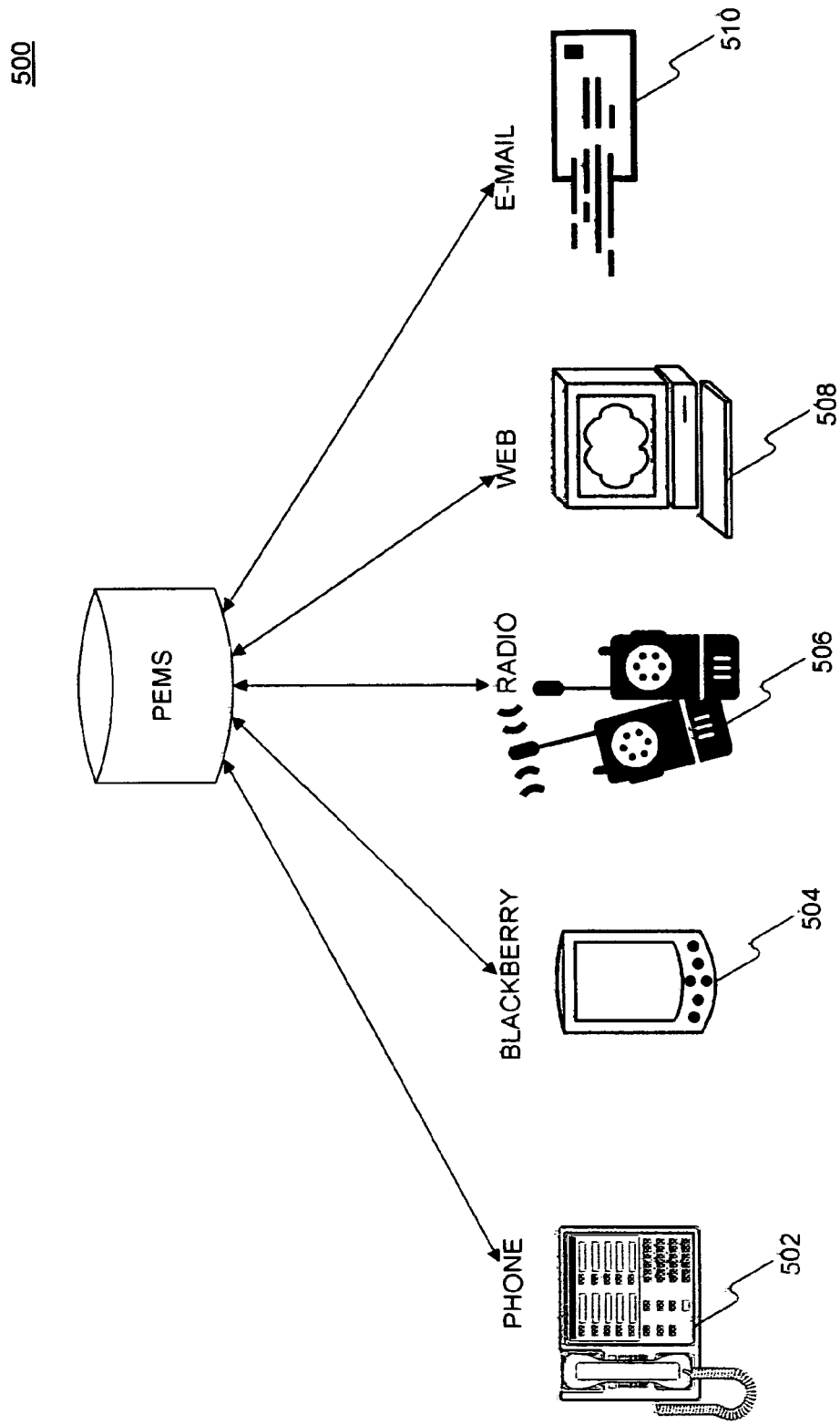
FIG. 5 is a schematic representation of an embodiment of communication systems that may be used to exchange information about an incident with individuals and entities.

Once emergency procedures have being initiated, the emergency management system may facilitate communication of notifications regarding an incident to all personnel responsible for response and tracking of an emergency. FIG. 5 is an exemplary diagram depicting methods of communication the emergency management system may use to exchange information about an incident with individuals and entities. Simultaneously, the emergency management system may generate notifications to individuals responsible for responding to an emergency incident via phone 502 and e-mail 510. People may also review notifications via web site 508 with which the emergency management system may interface. In another example, notifications from the emergency management system may be sent to wireless mobile devices with an access to e-mail 504, such as a hand-held device like a Blackberry™. In yet another example, communication with the emergency management system may be via portable radio 506. Emergency management may choose to designate certain Blackberries, as well as phone numbers and e-mail addresses, to have emergency response responsibilities instead of specific individuals. That may guarantee a prompt emergency response from emergency response personnel even if a designated individual is unavailable to respond to an incident.

Having continuous channels of communication with the emergency management system may enable personnel to have timely updates of the incident in progress. It may also provide media and government personnel with timely updates of an incident progress. In the alternative embodiment, an incident manager or personnel may provide a feedback from a site of an incident as it progresses enabling all parties involved to have a continuous update of events as they unfold.

One skilled in the art will recognize that many alternative embodiments are possible. For example, an organization may use records from previous incidents for analyzing trends for certain emergencies and updating and amending emergency response procedures based on that analysis. In yet another example, an organization may use the emergency management system as an electronic training mechanism enabling personnel to access and review emergency response related information via a web site or e-mail. Other alternatives are possible without departing from the spirit and scope of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for management of emergencies comprising:
   a database containing procedures for addressing specific emergencies, the database comprising a continuation of operations database that maintains information related to an alternative facility that can be used in the event of an emergency;
   an input system linked to said database for receiving input information indicative of an emergency;
   an evaluation system linked to said database for determining if information input to said input system justifies the designation of a specific emergency and dissemination of information related thereto;
   a communication system linked to said database for disseminating information about said input information and information related thereto to designated entities; and
   an information exchange system linked to said database for facilitating the exchange of emergency related information between the designated entities during a response to the specific emergency.

2. The system of claim 1 wherein said database resides on a server connected to the worldwide web.

3. The system of claim 1 wherein said input system comprises a remote threat sensor.

4. The system of claim 3 wherein said threat sensor is disposed to detect one of: fire, explosion, heat radioactivity, toxic chemicals and toxic biomaterials.

5. The system of claim 1 wherein said system disseminates information based on the type of threat detected by said threat sensor.

6. The system of claim 1 wherein said input system comprises a telephone system.

7. The system of claim 1 wherein said evaluation system comprises software stored in a system linked to said database.

8. The system of claim 1 wherein said communication system comprises a plurality of handheld devices capable of receiving information from said database.

9. The system of claim 8 wherein said communication system comprises a plurality of handheld devices capable of displaying information graphically on a display.

10. The system of claim 8 wherein said communication system comprises a plurality of handhold dotes capable of displaying information graphically on a display.

11. The system of claim 8 wherein said communication system comprises a plurality of handhold dotes capable of dissemination information audibly.

12. The system of claim 10 wherein said communication system comprises computer software disposed to transform emergency information in digital text format into audible emergency information.

13. The system of claim 1 wherein said communication system comprises a plurality of handheld devices programmed to receive information only relating to emergencies.

14. The system of claim 13 wherein said communication system comprises a plurality of handhold devices programmed to receive information only relating to emergencies for a particular entity.

15. The system of claim 1 wherein said communication system communicates with selected external agencies.

16. The system of claim 15 wherein said designated entities are selected from the group consisting of: agencies of the federal government, agencies of the state government, agencies of the county government, and agencies of the city government.

17. The system of claim 16 wherein external agencies of the federal government are selected from: the Federal Bureau of Investigation, the Office of Homeland Security, the Centers for Disease Control, and the Occupation Safety and Health Administration.

18. The system of claim 1 wherein said designated entities comprise internal agencies selected from the group of: security, health services, human resources, and personnel.

19. The system of claim 18 wherein said database includes personnel information such that said communication system communicates with selected internal agencies selected from the group of: security, health services, human resources, and personnel.

20. The system of claim 19 wherein said database includes information concerning the identify of individual employees, medical information about said employees, and the known location of said employee such that information disseminated by said communication system can be related to specific employees.

21. The system of claim 1 wherein said database includes information specific to a commercial entity.

22. The system of claim 21 wherein said database includes information concerning the physical configuration of structures of said commercial entity such that that said information disseminated by said communication system can be related to specific structures.

23. The system of claim 22 wherein said database includes information including the identify of individual employees and the location of said employee such that said information disseminated by said communication system can be related to a specific location and include the identify of employees at such a location.

24. The system of claim 1 wherein said database includes predetermined responses to specific emergencies.

25. The system of claim 24 wherein predetermined responses to specific emergencies are included in said information disseminated to designated entities.

26. The system of claim 1 wherein said database includes the identity of preselected individuals and their expected responses to specific emergencies.

27. The system of claim 24 wherein said database selects said designated entities.

28. The system of claim 24 wherein said database initiates communication of expected responses to specific emergencies to designated entities.

29. A method of managing emergencies comprising the steps of:
   inputting procedures for addressing specific emergencies into a database;
   inputting information about potential emergencies to said database;
   determining if said information justifies the designation of a specific emergency and dissemination of information related thereto;
   based on the determination of whether said information justifies the designation of a specific emergency and dissemination of information related thereto, disseminating information of a specific emergency and information related thereto via said database to designated entities and disseminating information pertaining to a continuation of operations and relating to an alternative facility that can be used in the event of an emergency via said database; and facilitating the exchange of emergency related information between the designated entities during a response to the specific emergency.

30. The method of claim 29 including the step of disseminating information based on the type of threat detected by a threat sensor.

31. The method of claim 29 including the step of displaying information graphically on a handheld display.

32. The method of claim 29 including the step of dissemination said information audibly with a hand held electronic device.

33. The method of claim 29 including the step of transforming emergency information in digital text format into audible emergency information.

34. The method of claim 29 including the step of communicating with selected external agencies.

35. The method of claim 29 wherein said designated entities are selected from the group consisting of: Agencies of the federal government, agencies of the state government, agencies of the county government, and agencies of the city government.

36. The method of claim 35 wherein said external agencies of the federal government are selected from: the Federal Bureau of investigation, the Office of Homeland Security, the Centers for Disease Control and the Occupation Safety and Health Administration.

37. The method of claim 29 wherein said designated entities comprise internal agencies selected from the group of: security, health services, human resources, and personnel.

38. The method of claim 29 including the step of communicating with selected internal agencies selected from the group of: security, health services, human resources, and personnel.

39. The method of claim 38 wherein said database includes information concerning the identify of individual employees, medical information about said employees, and the known location of said employee and said method includes the step of disseminating information related to specific employees.

40. The method of claim 29 wherein said database includes information specific to a commercial entity and includes information concerning the physical configuration of structures of said commercial entity and said method includes the step of disseminating information related to specific structures.

41. The method of claim 40 wherein said database includes information including the identity of individual employees and the location of said employee and the method includes the step of disseminating information related to a specific location including the identity of employees at such a location.

42. The method of claim 29 wherein said database includes predetermined responses to specific emergencies and said method includes the step of disseminating said predetermined responses to said designated entities.

43. The method of claim 29 wherein said database initiates communication of expected responses to specific emergencies to designated entities.

\* \* \* \* \*